Jan. 13, 1953  C. STADICK  2,625,059
SAW CARRIER GUIDING DEVICE
Filed March 22, 1950  2 SHEETS—SHEET 2

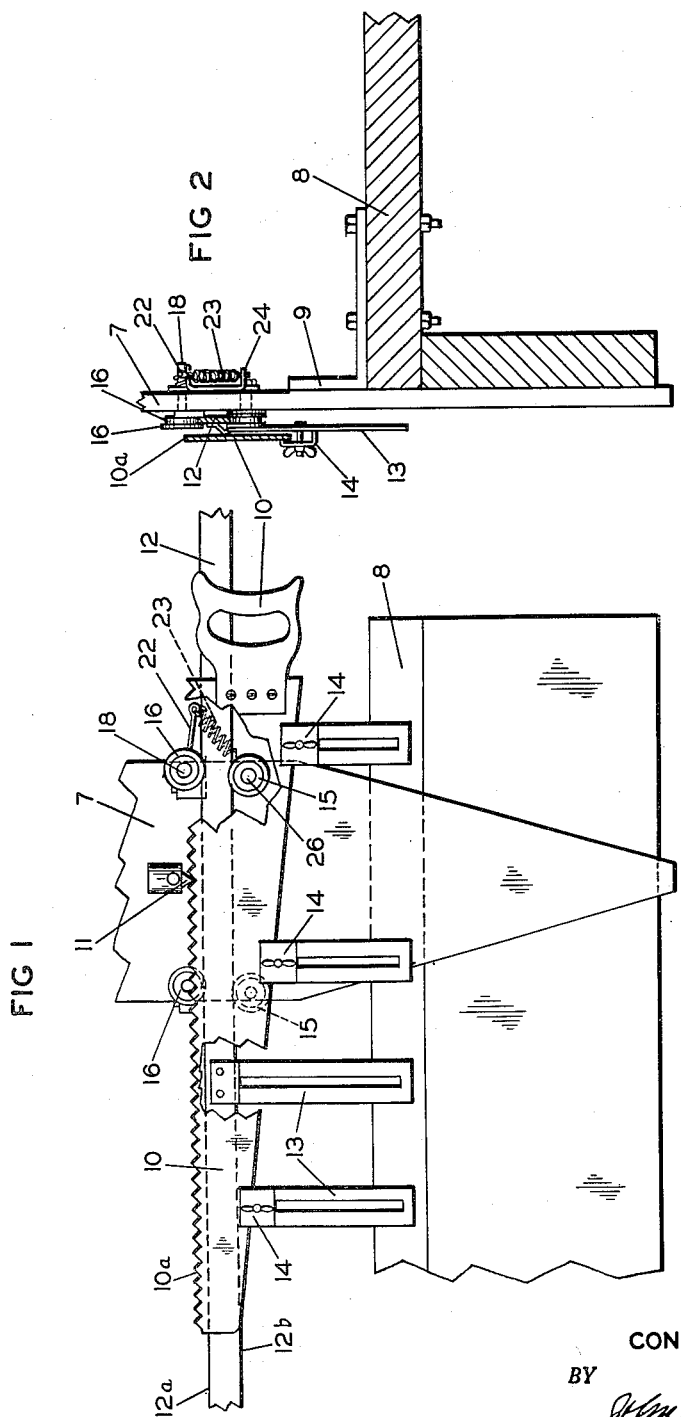

INVENTOR.
CONRAD STADICK
BY
John E. Stryker
ATTORNEY

Patented Jan. 13, 1953

2,625,059

UNITED STATES PATENT OFFICE 2,625,059

SAW CARRIER GUIDING DEVICE

Conrad Stadick, New Ulm, Minn.

Application March 22, 1950, Serial No. 151,070

5 Claims. (Cl. 76—74)

This invention relates to improvements in saw sharpening machines and particularly to guiding means for a carrier on which the saws are mounted and actuated to present the several teeth thereof to the sharpening tool or file carried by the machine.

It is an object of my invention to provide for a saw carrier of the class described guiding means adapted to prevent objectionable vibration of a saw blade mounted on the carrier during the operation of the machine, my device being arranged to facilitate smooth longitudinal movement of the carrier and saw as required to position successive teeth of the saw for engagement with the sharpening tool.

A particular object is to provide for the carrier of a saw filing machine a guide wheel or wheels which are resiliently held in rolling engagement with the carrier and so arranged as to prevent objectionable vibration of the saw during the operation of the file thereby increasing the rate of filing, insuring smooth, uniform operation and prolonging the useful life of the files.

A further object is to provide a carrier guide which is quickly and easily attachable to a saw filing machine of common type to improve the operation and prolong the life of the files as more fully herein described.

The invention also includes certain novel details of construction which will be more fully pointed out in the following specification and claims.

Referring to the accompanying drawings which illustrate by way of example and not for the purpose of limitation a preferred embodiment of my invention:

Figure 1 is a front elevational view showing my device in place on a saw filing machine of common type, the upper portion of the machine being omitted;

Fig. 2 is a fragmentary, part end view and part sectional view of the machine and device shown in Fig. 1;

Figure 3:
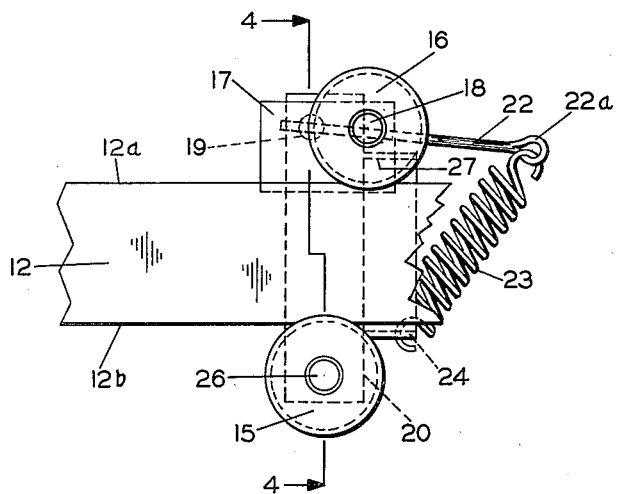
Fig. 3 is a detailed front elevational view of my device, together with a portion of the carrier bar, the frame of the machine being omitted.
Figure 4:
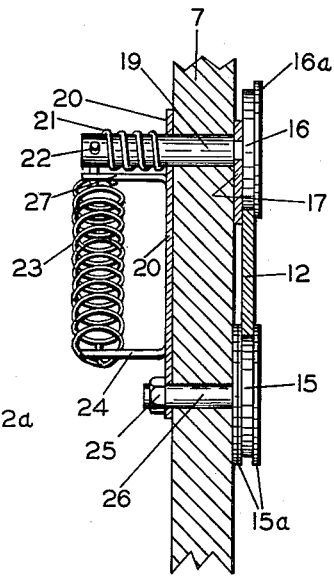
Fig. 4 is a vertical sectional view through the device and carrier bar taken on the line 4—4 of Fig. 3 and showing a fragmentary portion of the machine frame.
Figure 5:
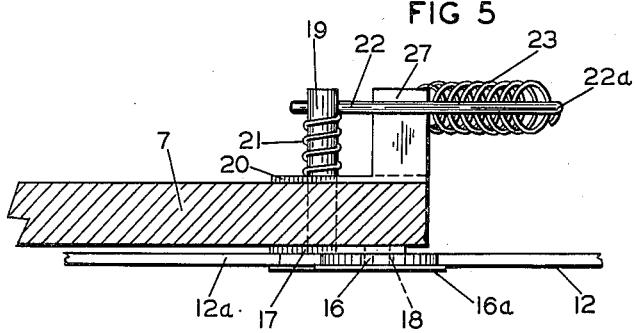
Fig. 5 is a top plan view of my device, together with fragmentary portions of the machine frame and carrier bar.
Figure 6:
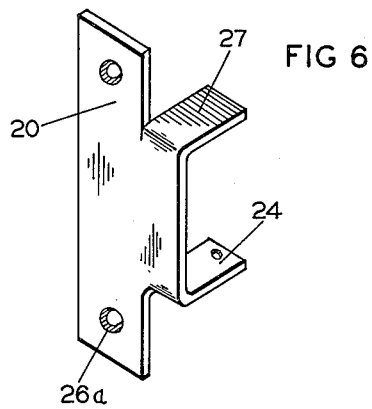
Fig. 6 is a perspective view showing the bearing bracket of my device.

In the drawings the numeral 7 indicates a substantially vertically disposed frame member of a saw filing machine of common type. This frame member is usually supported on a bench 8 or other suitable support by means of an angle bracket 9 which is rigidly secured to the frame member 7 and has a horizontal flange adapted to be fastened to the top of a bench 8. As shown in Figs. 1 and 2, a saw, in position for sharpening, is indicated generally by the numeral 10. To support the saw in operative relation to a sharpening tool, e. g., a three cornered file 11, the machine is provided with a carrier comprising a horizontally extending bar 12 to which is rigidly secured a plurality of depending arms 13 for engagement with the back face of the saw. Each of the arms 13 carries a vertically adjustable screw operated clamp jaw 14 adapted to engage the lower or back edge portion of the saw 10 to rigidly and adjustably hold the saw on the carrier. The saw is thereby held with its toothed edge 10a disposed in parallel relation to an upper edge surface 12a of the bar 12. This edge surface extends longitudinally of the bar 12 in substantially parallel relation to the opposite edge surface 12b. For crowned saws a carrier bar 12 of longitudinally curved form is provided.

The saw carrier hereinbefore described is mounted for movement across and adjacent to the front face of the frame member 8 between a pair of fixed guide wheels 15 engaging the lower surface 12b and a pair of spring biased wheels 16 which press down on the upper edge surface 12a and also bias the bar toward the front surface of the frame member 7. Front and back peripheral flanges 15a on each wheel 15 are spaced apart to confine the lower edge 12b of the bar 12 between them and the upper margin of this bar is confined between a front flange 16a on the wheel 16 and a thin plate 17 constituting a lever arm upon which the wheel 16 is mounted for limited movement to and from the bar 12. An axial pin 18 revolubly supports the wheel 16 on the plate 17 near one end thereof, this pin being rigidly secured at its inner end in a perforation in the plate. A rock shaft 19 is rigidly secured at its front end in a rectangular perforation in the plate 17, this shaft being spaced horizontally from the pin 18 carrying the wheel 16 so that the latter may be oscillated to and from the bar 12 by rocking the shaft 19. Extending horizontally through bearings in the frame 7 and in a bearing plate 20, the shaft 19 projects rearwardly from the plate 20 and carries a compression spring 21 adapted to bias the wheel 16 rearwardly so that its flange 16a is resiliently pressed against the front face of the bar 12 adjacent to the upper edge surface 12a. The rear end of the spring 21 is confined on the shaft 19 by a pin 22 which projects from and is fixed in a cross bore in the shaft. The pin 22 constitutes a lever arm for oscillating the shaft 19, plate 17 and wheel 16 carried thereby substantially transversely of the bar 12. A coiled tension spring 23 is connected at one end to an eye 22a formed in an end of the pin 22 and the other end of this spring is anchored on a rigid finger 24 which projects rearwardly from the plate 20.

Bearing plate 20 is held in place on the rear face of the frame member 7 by the spring 21 coacting with the pin 22 and also by a nut 25 which is threaded on the rear end portion of a bolt 26. This bolt affords an axial support for the wheel 15 and extends through a perforation in the frame member 7 and through a perforation 26a formed in the plate 20. To limit downward oscillating movement of the pin 22 about the axis of the shaft 19, I provide a stop finger 27 which is integral with the plate 20.

To attach my device to the filing machine, the bolt 26 and shaft 19 are merely inserted through existing perforations or drill holes in the frame member 7 and then the bearing plate 20 and spring actuated elements of the device at the back of the frame member 7 are assembled and mounted on the shaft and bolt as shown. With pairs of wheels 15 and 16 mounted on the frame member 7 in this manner, the bar 12 of the saw carrier is merely passed between the upper and lower wheels, thereby forcing the pins 22 to be oscillated upward from the stop fingers 27 and placing the bar 12 under spring compression laterally and toward the frame member 7. Either before or after mounting the carrier on the frame, a saw of any of the common sizes and types may be secured to the carrier by means of the clamp jaws 14 and with the toothed edge of the saw extending in parallel relation to the upper and lower edges of the bar 12.

In operation the saw mounted on the carrier is fed step by step in the usual manner and by suitable mechanism (not shown) to present successive teeth in operative position in relation to the file 11 or other sharpening tool provided on the machine. The files of such machines are operated with reciprocating motion obliquely across the blade of a saw and the ordinary guides for the carriers permit some lateral or vertical movement of the saw resulting in detrimental vibration during the filing. Such vibration greatly reduces the rate of filing and increases the rate of wear on the file, while creating objectionable noise. The present device prevents such detrimental vibration effectively and at the same time permits smooth operation of the saw carriage longitudinally during the feeding of the successive teeth of the saw to positions where they are sharpened by the file. My improved carrier guiding device has the further advantages of compensating for irregularities in the width and thickness of the carrier bar which is engaged by the spring biased guide wheels and of being adapted for use in guiding curved carrier bars of the kind commonly used to mount crowned saws on the machine.

Having described my invention, what I claim as new and desire to protect by Letters Patent is:

1. For a saw filing machine having a carrier to which a saw may be rigidly secured, said carrier having a longitudinal edge surface extending in parallel relation to the toothed edge of a saw mounted thereon and being movable longitudinally of the toothed edge of the saw in a plane parallel to the saw and said machine having a frame member extending adjacent to one side of said carrier, the improvements which comprise a guide wheel adapted for rolling engagement with said longitudinal edge surface of the carrier, an arm supporting said roller for oscillating movement to and from and laterally of said carrier, a shaft fixed at one end of said arm and supported on said frame member, spring means operatively connected to said shaft for biasing said arm toward said frame member and spring actuated means operatively connected to said shaft for biasing said wheel to resiliently engage said longitudinal edge surface of the carrier.

2. For a saw filing machine having a horizontally movable carrier to the front face of which a saw may be rigidly secured, said carrier having a horizontally disposed longitudinal edge surface extending in parallel relation to and rearwardly of the toothed edge of a saw mounted on said carrier and said machine having a substantially vertically disposed frame member extending adjacent to the rear face of said carrier, the improvements which comprise, a guide wheel adapted for rolling engagement with said longitudinal edge surface of the carrier, an arm supporting said wheel for oscillating movement to and from said carrier surface and laterally thereof, a bearing plate overlying the back surface of said frame member, a shaft fixed at its front end to said arm and extending rearwardly through bearings in said frame member and plate, a coiled spring confined on the rear end portion of said shaft and operatively connected thereto for biasing said arm toward said frame member, a second arm operatively connected to the rear end portion of said shaft and a spring operatively connected to said second arm for biasing said wheel to resiliently engage said longitudinal edge surface of the carrier.

3. In a saw filing machine, the combination of a rigid unitary carrier bar to which a saw blade may be rigidly secured, said bar extending in parallel relation to one face of said blade and having opposite edge surfaces extending in substantially parallel relation to the toothed edge of the saw carried thereby, a fixed frame member extending adjacent to a side surface of said bar, means engaging the side of said bar adjacent to said frame member, a guide wheel mounted on said frame member for rolling engagement with one of said longitudinal edge surfaces of the bar and movable to and from said frame member, said wheel being formed with a peripheral flange projecting for engagement with the side surface of said bar remote from said frame member contiguous to said edge surface of said bar and spring actuated means operatively connected to said wheel for biasing it axially toward said frame member to cause said peripheral flange to resiliently engage said side surface of the bar remote from said frame member and thereby confine said bar against lateral vibration.

4. In a saw filing machine, the combination of a rigid unitary carrier bar to which a saw blade may be rigidly secured, said bar extending in spaced parallel relation to one face of the saw blade carried thereby and having longitudinal edge surfaces which are substantially parallel to the toothed edge of the saw mounted thereon, a fixed frame member extending adjacent to a side surface of said bar, a guide wheel mounted on said frame member for rolling engagement with one of said longitudinal edge surfaces of the bar and formed with a peripheral flange projecting for engagement with one of the face surfaces of said bar contiguous to said edge surface, an arm supporting said wheel for oscillating movement to and from said edge surface of the bar, said arm being movably supported on said frame member, spring actuated means operatively connected to said arm for biasing said wheel to resiliently engage said edge surface of the bar and spring actuated means operatively connected to said wheel for biasing it axially toward said frame member to cause said peripheral flange to resiliently engage said side surface of the bar and thereby confine said bar against lateral vibration.

5. For a saw filing machine having a carrier to which a saw blade may be rigidly connected, said carrier comprising a bar having oppositely disposed longitudinal edge surfaces extending in substantially parallel relation to the toothed edge of a saw mounted on the carrier and having side surfaces disposed in planes which are substantially parallel to a side surface of the saw, said machine having a frame member extending adjacent to said bar, the improvements which comprise, flanged guide wheels mounted on said frame member and disposed to rotate in a common plane which is substantially parallel to said frame member and saw blade, said wheels being mounted in rolling engagement with said oppositely disposed edge surfaces respectively of said bar, resilient means biasing at least one of said wheels to resiliently engage an edge surface of said bar, means engaging one of said side surfaces of the bar and resilient means biasing at least one of said wheels toward the other side surface of the bar to cause the flange on said wheel resiliently to engage said last mentioned side surface of the bar and thereby confine the bar against lateral vibration.

CONRAD STADICK.

REFERENCES CITED

The following references are of record in the file of this patent:

UNITED STATES PATENTS

| Number | Name | Date |
|---|---|---|
| 332,611 | Johns | Dec. 15, 1885 |
| 1,668,361 | Foley | May 1, 1928 |
| 2,343,171 | Collier | Feb. 29, 1944 |
| 2,498,167 | Lorenz | Feb. 21, 1950 |
| 2,535,439 | McEwan | Dec. 26, 1950 |